(No Model.)
F. HARRISON.
SAW GUIDE.
No. 284,007. Patented Aug. 28, 1883.
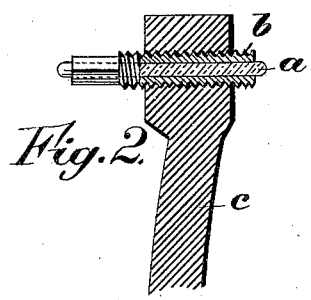
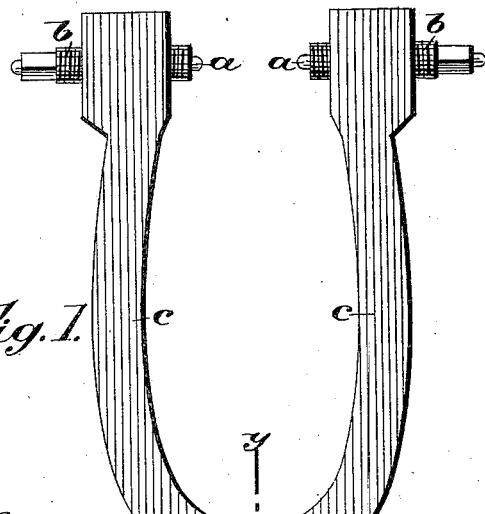
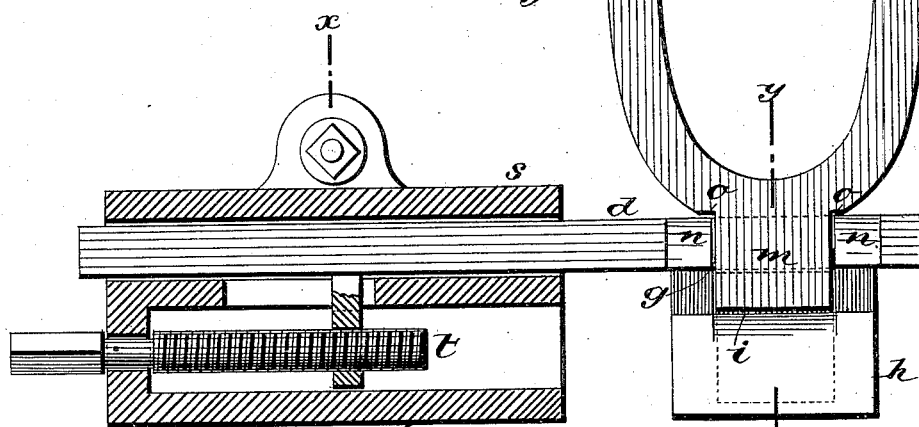
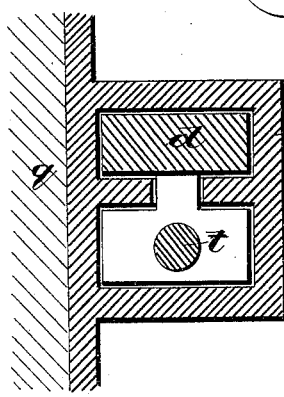
WITNESSES:
INVENTOR:
F. Harrison
BY
ATTORNEYS.

UNITED STATES PATENT OFFICE.

FRANK HARRISON, OF LOVELAND, COLORADO.

SAW-GUIDE.

SPECIFICATION forming part of Letters Patent No. 284,007, dated August 28, 1883.

Application filed March 30, 1883. (No model.)

*To all whom it may concern:*

Be it known that I, FRANK HARRISON, of Loveland, in the county of Larimer and State of Colorado, have invented a new and Improved Saw-Guide, of which the following is a full, clear, and exact description.

The object of the invention is to improve saw-guides, as hereinafter described, and pointed out in the claims.

Reference is to be had to the accompanying drawings, forming part of this specification, in which similar letters of reference indicate corresponding parts in all the figures.

Figure 1 is a plan view of the guide and horizontal section of the supporting and adjusting contrivance. Fig. 2 is a horizontal section of one of the guide-studs. Fig. 3 is a transverse section of Fig. 1 on line $xx$, and Fig. 4 is a transverse section on line $yy$ of Fig. 1.

I propose to employ glass guide-studs $a$ for the bearing-points with which the saw is to have contact, said studs being cylinders of glass, which are to be fitted in position by being arranged in the bore of hollow adjusting-screws $b$ of the yoke $c$, employed to support the said guide-studs on the respective sides of the saw, the said glass cylinder being firmly fitted in the screws, to prevent being forced back by the pressure of the saw, but so that they may be shifted forward from time to time as they wear away. In order to enable the yoke $c$ to be readily swung up out of the way of the saw or be taken off altogether when the saw is to be removed, I connect the yoke $c$ to its supporting-bar $d$ by means of the elbow $ef$ of the shank $m$ of the yoke, the notch $g$ in the upper side of the bar $d$, and the block $h$, attached to the bar $d$, and having the mortise $i$ and notch $j$ for the elbow-shank $ef$, the shoulders of the mortise being beveled at $k$ and curved at $l$, to enable the yoke to be connected by inserting part $f$ vertically in mortise $i$, and swinging the yoke down into notch $g$. The part $m$ of the shank of the yoke rests in notch $g$, and the part $f$ bears upon the bottom of notch $j$ in supporting the saw-guide in the working position.

For adjusting the guide laterally to the saw, I arrange the bar $d$ to slide in the support $s$, by which it is mounted on the saw-frame $q$, and fit an adjusting-screw, $t$, to it for shifting the guide to set it accurately, as is required in such cases, and to shift it as may be required with different saws, which may vary slightly, although placed in the same position on the mandrel.

The bar $d$ has the angles $n$ dressed off each side of the notch $g$ to the curvature of the circle in which the shoulders $o$ swing, for clearance for them.

Having thus described my invention, I claim as new and desire to secure by Letters Patent—

1. In a saw-guide, the block having a mortise and notch, in combination with the bar having a notch, and the shank of the yoke having an angular or elbow form, the shoulders of said mortise being respectively beveled and curved, all as shown and described.

2. The yoke $c$ of a saw-guide, connected detachably to its supporting-bar $d$ by the elbow $ef$ of its shank $m$, notch $g$ in bar $d$, and the mortise $i$ and notch $j$ of the block $h$, attached to said bar $d$, substantially as described.

FRANK HARRISON.

Witnesses:
W. S. RUSSELL,
J. M. ALDRICH.